(12) United States Patent
Himes, II et al.

(10) Patent No.: US 6,793,863 B1
(45) Date of Patent: Sep. 21, 2004

(54) PROCESS FOR PRODUCING A SPARK PLUG BOOT RESISTOR ASSEMBLY

(75) Inventors: J. Mark Himes, II, East Canton, OH (US); John C. Miller, North Canton, OH (US)

(73) Assignee: Lexington Insulators, Jasper, GA (US)

( * ) Notice: Subject to any disclaimer, the term of this patent is extended or adjusted under 35 U.S.C. 154(b) by 0 days.

(21) Appl. No.: 09/333,442

(22) Filed: Jun. 15, 1999

(51) Int. Cl.$^7$ .............................................. B29C 45/14
(52) U.S. Cl. ............... 264/262; 264/271.1; 264/272.11; 264/272.15
(58) Field of Search ................................ 264/262, 261, 264/272.15, 271.1, 272.11, 272.2; D13/127; 315/49; 123/169 R, 169 PA; 439/125, 126, 127, 128, 846, 278

(56) References Cited

U.S. PATENT DOCUMENTS

| | | | | |
|---|---|---|---|---|
| 1,161,194 A | * | 11/1915 | Cook ........................... | 264/262 |
| 2,544,430 A | * | 3/1951 | McCutchan .................. | 264/262 |
| 3,044,127 A | | 7/1962 | Alden | |
| 3,210,577 A | * | 10/1965 | Hogue ...................... | 264/272.2 |
| 3,387,364 A | | 6/1968 | Boggs | |
| 3,608,049 A | * | 9/1971 | Tavella et al. ............... | 264/229 |
| 3,914,003 A | | 10/1975 | Loy | |
| 4,410,469 A | * | 10/1983 | Katagiri et al. .......... | 264/272.15 |
| 4,481,380 A | * | 11/1984 | Wood et al. ............ | 264/272.15 |
| 4,497,532 A | * | 2/1985 | Bezusko et al. ............ | 339/112 |
| 4,573,258 A | * | 3/1986 | Io et al. .................... | 264/272.2 |
| 4,884,977 A | | 12/1989 | Sturdevan | |
| 5,059,768 A | | 10/1991 | Hatanaka et al. | |
| 5,145,433 A | | 9/1992 | Yagi et al. | |
| 5,163,838 A | | 11/1992 | Tura, Jr. et al. | |
| 5,348,486 A | | 9/1994 | Tura, Jr. et al. | |
| 5,716,223 A | * | 2/1998 | Phillips, Jr. et al. ........ | 439/125 |
| 6,326,595 B2 | | 12/2001 | Taniguchi et al. | |
| 6,375,884 B1 | * | 4/2002 | Shikama et al. ....... | 264/272.15 |

FOREIGN PATENT DOCUMENTS

| | | | |
|---|---|---|---|
| DE | 2613 236 B2 | 10/1977 | |
| DE | 3218752 C2 | 11/1983 | |
| DE | 3810886 C2 | 10/1989 | |
| DE | 43 26 480 A1 | 2/1996 | |
| DE | 196 12 508 A1 | 3/1996 | |
| DE | 195 09 793 C2 | 9/1996 | |
| DE | 296 11 795 | 4/1997 | |
| FR | 2 728 400 | 6/1996 | |
| GB | 772054 | * 4/1957 | ................. 264/262 |

* cited by examiner

*Primary Examiner*—Mark Eashoo
(74) *Attorney, Agent, or Firm*—Nixon Peabody LLP

(57) ABSTRACT

Next, a shield is positioned in the mold. The shield is made of a metallic material and has a substantially tubular shape. Next, a resistor is positioned inside the shield and the mold. Once the shield and the resistor are in place in the mold, a rubber material is injected into the mold between the shield and the resistor. Once the rubber material has cooled, then the spark plug boot resistor assembly is removed from the mold.

16 Claims, 2 Drawing Sheets

PROCESS FOR PRODUCING A SPARK PLUG BOOT RESISTOR ASSEMBLY

FIELD OF INVENTION

This invention is related generally to a process for making automotive parts and, more particularly, to a process for producing a spark plug boot resistor assembly.

BACKGROUND OF THE INVENTION

The manufacture of spark plug boot resistor assemblies has been a costly and complicated procedure involving several steps. Typically to make a spark plug boot resistor assembly, two halves of an outer heat and radio frequency shield are stamped out and a silicon rubber boot is compression molded and cured. Next, a resistor is inserted into the interior of the silicon rubber boot. Once the resistor is positioned within the silicon rubber boot, the halves of the outer heat and radio frequency shield are placed around the silicon rubber boot and are crimped together.

Although this process for manufacturing a spark plug boot resistor assembly works, it has a number of problems. For example, the process requires that the silicon rubber boot be manufactured prior to any assembly. The process for manufacturing a silicon rubber boot is complicated requiring several operations and some complex tooling and handling. As a result, the overall cost of manufacturing spark plug boot resistor assemblies is increased while the overall production throughput is decreased because of the additional steps required. Additionally, the process requires the shield to be installed after the resistor is inserted into the silicon rubber boot. This additional step also adds to the overall cost of manufacturing spark plug boot resistor assemblies while reducing overall production throughput.

Another problem with prior processes for manufacturing spark plug boot resistor assemblies is with the installation of the resistor in the silicon rubber boot. The fit between the resistor and the silicon rubber boot is not always precise. As a result, gaps may be formed between the resistor and the silicon rubber boot which provide a space for fluid to seep in and corrode the resistor. Additionally, since a resistor must be inserted into each silicon rubber boot, the precise location of the resistor within the boot will vary from boot to boot. Since the points of connection to the ends of the resistor are located inside of the silicon rubber boot, if the location of the resistor varies then a connector may not be able to reach and properly connect to one end of the resistor.

SUMMARY OF THE INVENTION

A process for producing a spark plug boot resistor assembly in accordance with one embodiment of the present invention includes a few of steps. First a mold is provided and a shield is positioned in the mold. The shield is made of a metallic material and has a substantially tubular shape. Next, a resistor is positioned inside the shield and the mold. Once the shield and the resistor are in place in the mold, a rubber material is injected into the mold between the shield and the resistor. Once the rubber material has cured, then the spark plug boot resistor assembly is removed from the mold.

A process for producing a spark plug boot resistor assembly in accordance with another embodiment of the present invention also includes a few steps. First, a mold is provided and then a shield is positioned in the and a resistor is positioned inside the shield. Next, a material is injected into the mold between the shield and the resistor. The mold is designed to form first passages in the material adjacent opposing ends of the shield. Each passage extends to one end of the resistor and along a portion of the side of the resistor. Once the material has cured, then the spark plug boot resistor assembly is removed from the mold.

A process for producing a spark plug boot resistor assembly in accordance with yet another embodiment of the present invention also includes a few steps. First, a mold with a first portion and a second portion is provided. Next, a shield is positioned in the first portion of the mold and then a resistor is positioned inside the shield in the first portion of the mold. Once the shield and the resistor are in place, then the second portion of the mold is closed over the first portion of the mold. Next, a material is injected into the mold between the shield and the resistor. Once the material has cured, the second portion of the mold is separated from the first portion of the mold and then the spark plug boot resistor assembly is removed from the first portion of the mold.

The process for producing a spark plug boot resistor assembly in accordance with the present invention provides a number of advantages. For example, the process is less complicated and as a result is less expensive and has a higher overall production throughput than prior processes. The process does not require the silicon rubber boot to be formed prior to the assembly of the resistor within the heat and radio frequency shield. Instead, the boot is formed with the resistor in place. This eliminates several operations and some complicated tooling and handling. Additionally, the process does not require the additional step of crimping the shield around the silicon rubber boot.

Another advantage of the present invention is with the sealing and positioning of the resistor within the shield. Unlike past processes which required the resistor to be inserted into a preformed boot, with the present invention the boot is formed around the resistor. As a result, a tight seal is formed between the resistor and the boot which minimizes and/or prevents any fluid from leaking in and causing the resistor to corrode. Additionally with the present invention, the resistor is more precisely positioned within the boot each time a spark plug boot resistor assembly is formed than is possible when the resistor is inserted into the boot As a result, the connection points at the ends of the resistor will always be at the same location, thus reducing the chance of an improper connection.

Another advantage of the present invention is the ability to precisely form passages in the material injected between the shield and the resistor which are used to mate with other automotive parts. Not only can the passages be formed which extend in to the ends of the resistor, but these passages can be formed to extend in past the ends of the resistor and around a portion of the side of the resistor. The portions of these passages along the side of the resistor help to ensure a good connection between the resistor and a connector extending into the passage in the material. With prior processes, these passages extending past and along the side of the resistor were not feasible because they would make the spark plug boot resistor assembly susceptible to leakage. Additionally, since the boot is formed after the shield and the resistor are in place in the mold, it is possible to form additional passages between the shield and the injected material at each end of the shield. These passages can be used to assist in the connection between the spark plug boot resistor assembly and other automotive components. Similarly, these additional passages were not feasible with prior processes because the shields were crimped around the silicon rubber boot after the resistor is inserted. As a result, it would be very difficult to precisely control the crimping to create the right space for these passages consistently.

Yet another advantage of the present invention is the use of a split mold which simplifies the manufacturing process. With the split mold the resistor and shield can be more easily installed and removed from the mold during manufacturing.

DETAILED DESCRIPTION

Figure 1:
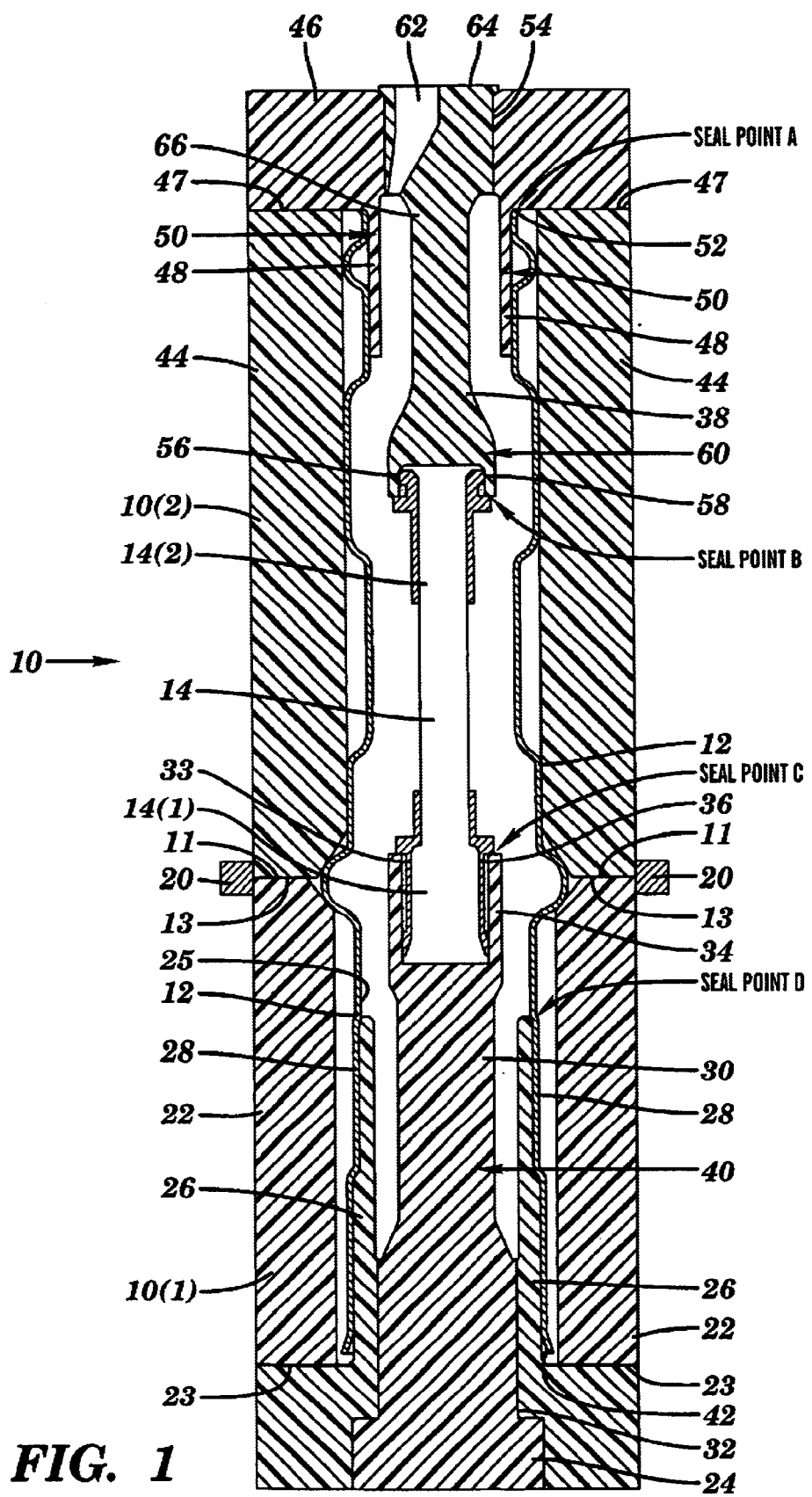
FIG. 1 is a cross-sectional view of a mold with a shield and a resistor installed which is used to make a spark plug boot resistor assembly in accordance with one embodiment of the present invention.

A mold 10 along with a shield 12 and a resistor 14 used in producing a spark plug boot resistor assembly 16 in accordance with one embodiment of the present invention is illustrated in FIG. 1. The process includes providing the mold 10, positioning the shield 12 in the mold 10 and the resistor 14 inside the shield 12 and the mold 10, injecting a material into the mold between the shield 12 and the resistor 14, and then removing the spark plug boot resistor assembly 16 once the material 18 has cooled. The process provides a number of advantages including providing a simplified and less expensive process for manufacturing higher quality spark plug boot resistor assemblies.

Referring more specifically to FIG. 1, in this particular embodiment the mold 10 includes a first portion 10(1) and a second portion 10(2). In this particular embodiment, the mold 10 is broken into two portions of which are substantially the same sizes, i.e. the mold 10 is broken into two substantially equal size halves, the portions 10(1) and 10(2) can have different sizes, e.g. one portion might be two-thirds of the mold and the other portion may be one-third of the mold 10. The mold 10 may also be divided into more than two portions or sections, e.g. three, four or more sections or portions. The edge 11 of the second portion 10(2) of the mold 10 is shaped to mate with the edge 13 of the first portion 10(1) of the mold 10 and brackets and bolts 20 secure the first and second portions 10(1) and 10(2) together. Although one manner for connecting and securing the second portion 10(2) of the mold 10 to the first portion 10(1) of the mold 10 is shown, other manners of connecting and securing the first and second portions 10(1) and 10(2) together can be used as needed or desired.

The first portion 10(1) of the mold 10 has a side wall 22 which is connected to an insert 24. In this particular example, the side wall 22 has a substantially cylindrical shape, although the side wall 22 can have other shapes, such as triangular, square, or hexagonal. The insert 24 is connected to an edge 23 of the side wall 22, although the insert 24 can be connected to the side wall 22 at other locations. The insert 24 has a wall 26 which has a substantially cylindrical shape and which extends into the mold 10 and is adjacent to a portion of the inner surface 25 of the shield 12, although the wall 26 extending into the mold 10 from the insert 24 can have other shapes, such as triangular. square, or hexagonal. When material 18 is injected into the mold 10, the wall 26 extending into the mold 10 from the insert 24 defines a passage 28 between a portion of the shield 12 and the cured material 18 adjacent one end of the shield 12. This passage 28 is used to help secure one end of the spark plug boot resistor assembly 16 to other automotive components.

In this particular embodiment, the passage 28 has a substantially circular cross-sectional shape, although the passage 28 can have other shapes, such as triangular, square, or hexagonal.

A pin 30 is connected to the insert 24 and extends up into the first portion 10(1) of the mold 10 and inside of the wall 26. In this particular embodiment, the pin 30 is seated within an opening 32 in and is secured to the insert 24, although the pin 30 can be connected to the insert 24 in other manners. The upper end 34 of the pin 30 includes a recess 36 which is shaped to receive one end 14(1) of the resistor 14. The pin 30 helps to position and support the resistor 14 in the first portion 10(1) of the mold 10. With the help of the pins 30 and 38, the resistor 14 will be positioned in the same location each time a spark plug boot resistor assembly 16 is manufactured. When material 18 is injected into the mold 10, the pin 30 defines another passage 40 which extends in from one end 42 of the shield 12 to one end 14(1) of and along the side of the resistor 14. The passage 40 provides a path for a connector (not shown) to reach one end 14(1) of and to be seated over a portion of the side of the resistor 14 to ensure a secure connection. In this particular embodiment, the passage 40 has a substantially cylindrical shape, although the passage 40 can have other cross-sectional shapes, such as triangular, square, or hexagonal.

The second portion 10(2) of the mold 10 has a side wall 44 which is connected to an insert 46. In this particular example, the side wall 44 has a substantially cylindrical shape, although the side wall 44 can have other shapes, such as triangular, square, or hexagonal. The insert 46 is connected to an edge 47 of the side wall 44, although the insert 46 can be connected to the side wall 44 at other locations. The insert 46 has a wall 48 which has a substantially cylindrical shape and which extends into the mold 10 and is adjacent to a portion of the inner surface 25 of the shield 12, although the wall 48 extending into the mold 10 from the insert 46 can have other shapes, such as triangular, square, or hexagonal. When material 18 is injected into the mold 10, the wall 48 extending into the mold 10 from the insert 46 defines a passage 50 between a portion of the shield 12 and the cured material 18 adjacent another end 52 of the shield 12. This passage 50 is used to help secure one end of the spark plug boot resistor assembly 16 to other automotive components In this particular embodiment, the passage 50 has a substantially circular cross-sectional shape, although the passage 50 can have other shapes, such as triangular, square, or hexagonal.

The pin 38 is connected to the insert 46 and extends down into the second portion 10(2) of the mold 10 and inside of the wall 48. In this particular embodiment, the pin 38 is seated within an opening 54 in and is secured to the insert 46, although the pin 38 can be connected to the insert 46 in other manners. The lower end of the pin 38 includes a recess 58 which is shaped to receive another end 14(2) of the resistor 14. The pin 38 helps to position and supports the resistor 14 in the second portion 10(2) of the mold 10. Again with the help of the pins 30 and 38, the resistor 14 will be positioned in the same location each time a spark plug boot resistor assembly 16 is manufactured. When material 18 is injected into the mold 10, the pin 38 defines another passage 60 which extends in from the other end 52 of the shield 12 to the other end 14(2) of and along the side of the resistor 14. The passage 60 provides a path for a connector to reach one end 14(2) of and to be seated over a portion of the side of the resistor 14 to ensure a secure connection. In this particular embodiment, the passage 60 has a substantially circular cross-sectional shape, although the passage 60 can have other shapes, such as triangular, square, or hexagonal.

A sprue 62 extends in from an outer surface 64 of the insert 46 to an inner surface 66. The sprue 62 provides a passage for the material 18 to be injected into the mold 10. Although only one sprue 62 in the second portion 10(2) of the mold 10 is shown, the mold 10 can have multiple sprues 62 which can be located in different locations in the mold 10.

The shield 12 is used to protect the spark plug boot resistor assembly 16 from heat and radio frequencies. In this particular embodiment, one end 42 of the shield 12 is positioned inside the first portion 10(1) of the mold 10 and over the wall 26 extending up from the insert 24. The other end 52 of the shield 12 is positioned inside the second portion 10(2) of the mold 10 and over the wall 48 extending down from the insert 46. The fit between the shield 12 and the walls 26 and 48 at each end 42 and 52 is designed to be snug so that a seal is formed at least at seal points A and D to prevent any material 18 injected into the mold 10 from leaking out. In this particular embodiment, the shield 12 is made of a metallic material and has a substantially cylindrical shape, although the shield 12 can be made of other materials, such as plastic composite, and can have other shapes, such as triangular, square, or hexagonal.

The resistor 14 is positioned in the mold 10 using the pins 30 and 38. One end 14(1) of the resistor 14 is positioned in the recess 36 in the inner end 33 of the pin 30 and the other end 14(2) of the resistor 14 is positioned in the recess 58 in the inner end 56 of the pin 38. The fit between the ends 14(1) and 14(2) of the resistor 14 and the recesses 36 and 58 in the pins 30 and 38 is designed to be snug so that a seal is formed at least at seal points B and C to prevent any material 18 injected into the mold 10 from leaking past that location.

Figure 2A:
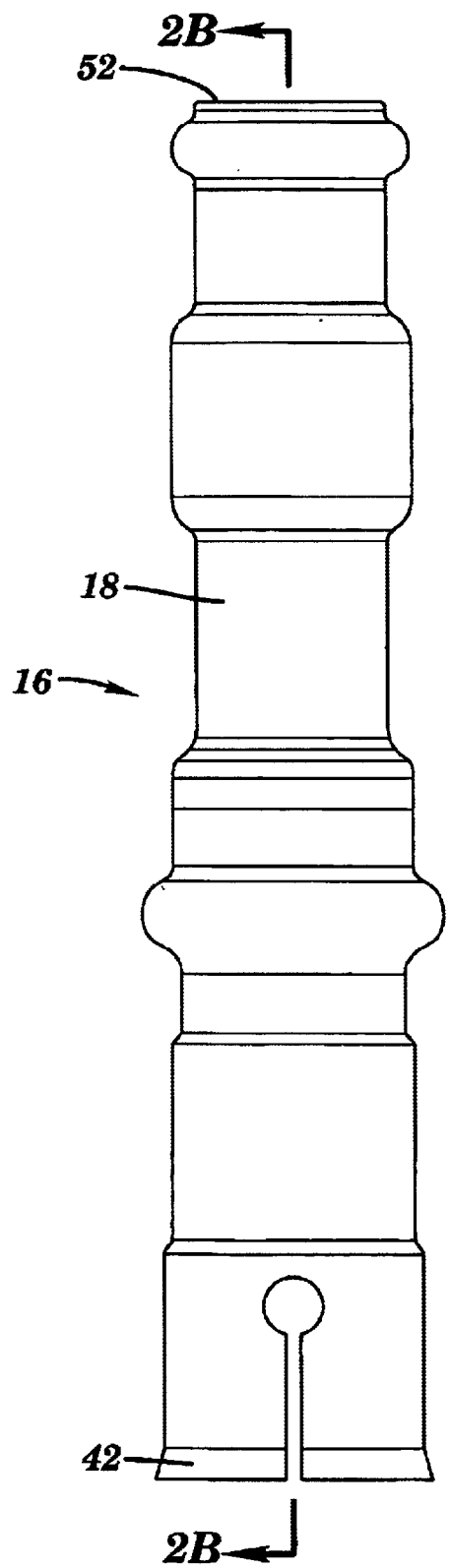
FIG. 2A is a perspective view of a spark plug boot resistor assembly in accordance with one embodiment of the present invention.
Figure 2B:
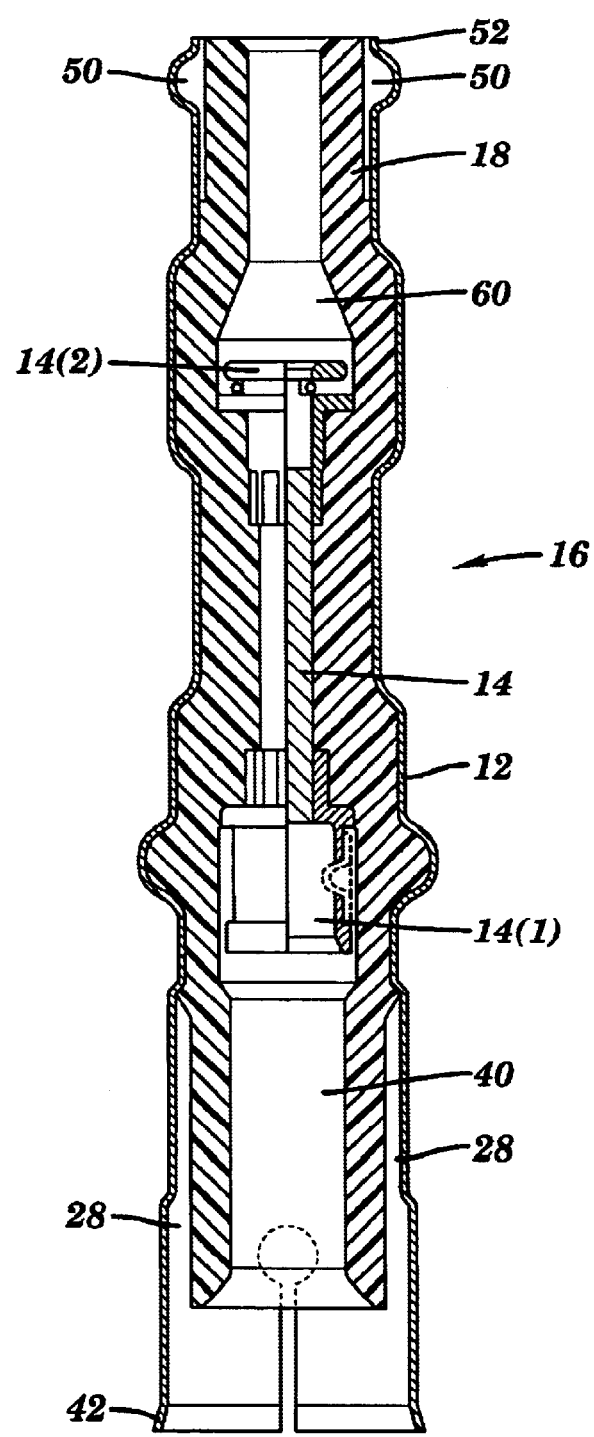
FIG. 2B is a cross-sectional view of the spark plug boot resistor assembly taken along lines 2B—2B in FIG. 2A.

Referring to FIGS. 2A and 2B, a spark plug boot resistor assembly 16 made in accordance with the present invention is illustrated. The resistor 14 is precisely positioned inside the shield 12 and is held in place by the injected material 18. Passages 40 and 60 are formed in the material 18 adjacent each end 42 and 52 of the shield 12 which extend in to and along the side of a portion of the resistor 14 to provide room for a connector to reach each end 42 and 52 of the resistor 14 and make a connection. Other passages 28 and 50 are formed between the shield 12 and the material 18 adjacent each end 42 and 52 of the shield 12.

A process for manufacturing spark plug boot resistor assembly 16 in accordance with one embodiment of the present invention will be discussed with reference to FIGS. 1, 2A, and 2B. First, a mold 10 with a first and second portions 10(1) and 10(2) is provided. The second portion 10(2) of the mold 10 is disconnected from the first portion 10(1) of the mold 10. A pin 30 is placed in the opening 32 in the insert 24 and is secured to the insert 24 in the first portion 10(1) of the mold 10. Similarly, a pin 38 placed in the opening 54 in the insert 46 and is secured to the insert 46 in the second portion 10(2) of the mold 10.

Next, one end 42 of a shield 12 is positioned over the wall 26 extending up from the insert 24 so that a portion of the inner surface of the shield 12 is pressing against a portion of the outer surface of the wall 26. The pressure between the shield 12 and the wall 26 creates a seal point D which prevents any material 18 injected into the mold 10 from leaking past that location.

Either before or after the shield 12 is inserted into the first portion 10(1) of the mold 10, one end 14(1) of the resistor 14 is positioned in the opening or recess 36 in the inner end 33 of the pin 30 so that a portion of the outer surface of the resistor 14 is pressing against a portion of the inner surface of the sides of the opening 36 in the pin 30. The pressure between the resistor 14 and the sides of the opening 36 in the pin 30 creates a seal point C which prevents any material 18 injected into the mold 10 from leaking past that location.

Next, the second portion 10(2) of the mold 10 is placed over the first portion 10(1) of the mold 10. The second portion 10(2) of the mold 10 is positioned over the first portion 10(1) of the mold 10 so that the other end of the resistor 14(2) is positioned in the opening or recess 58 in the inner end 56 of the pin 38 so that a portion of the outer surface of the resistor 14 is pressing against a portion of the inner surface of the sides of the opening 58 in the pin 38. The pressure between the resistor 14 and the sides of the opening 58 in the pin 38 creates a seal point B which prevents any material 18 injected into the mold 10 from leaking past that location.

The second portion 10(2) of the mold 10 is also positioned over the fist portion 10(1) Of the mold 10 so that the other end 52 of the shield 12 is positioned over the wall 48 extending from the insert 46 so that a portion of the inner surface of the shield 12 is pressing against a portion of the outer surface of the wall 48. The pressure between the shield 12 and the wall 48 creates a seal point A which prevents any material 18 injected into the mold 10 from leaking past.

Next, a material 18, such as rubber, is injected into the mold 10 between the shield 12 and the resistor 14. In this particular embodiment, the material 18 is injected through the sprue 62 located in the insert 46 of the second portion 10(2) of the mold 10. A variety of different materials 18, such as rubber or silicone rubber, can be injected into the mold 10. In this particular example, the material 18 injected is rubber. Preferably in this example. the rubber is heated to a temperature ranging between about 350 and 400 degrees Fahrenheit prior to the injection, is injected at a pressure ranging between about 1000 and 1500 PSI, and is cured for about 8 minutes.

Once the material 18 has cured, the second portion 10(2) of the mold 10 is separated from the first portion 10(1) of the mold 10. With the second portion 10(2) removed, the spark plug boot resistor assembly 16 can be easily removed from the first portion 10(1) of the mold 10.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A process for producing a spark plug boot resistor assembly comprising:

providing a mold;

positioning a shield in the mold;

positioning a resistor inside the shield;

injecting an insulating material into the mold between the shield and the resistor, the mold forming a first passage in the insulating material adjacent each end of the shield which extends in to each end of the resistor, wherein at least one of the first passages extends in along a portion of a side of the resistor; and removing the plug boot resistor assembly from the mold once the insulating material has cured.

2. The process as set forth in claim 1 wherein the mold comprises a first portion and a second portion and wherein the shield and the resistor are first positioned in the first portion of the mold and then the second portion of the mold is connected to the first portion.

3. The process as set forth in claim 2 wherein the insulating material is injected into the mold through at least one sprue located in the second portion of the mold.

4. The process as set forth in claim 3 wherein the shield and the resistor are removed from the mold by first separating the second portion of the mold from the first portion of the mold and then removing the spark plug boot resistor assembly from the first portion of the mold.

5. The process as set forth in claim 1 wherein the mold forms a second passage adjacent the one end of the shield between the insulating material and the shield.

6. The process as set forth in claim 1 wherein the shield is one piece.

7. The process as set forth in claim 1 wherein the insulating material is a rubber material that is cured for about six to ten minutes, is injected at a pressure ranging between about 1000 and 1500 PSI, and is heated to a temperature ranging between about 350 to 400 degrees Fahrenheit prior to the injection.

8. A process for producing a spark plug boot resistor assembly comprising:

providing a mold;

positioning a shield in the mold;

positioning a resistor inside the shield;

injecting a material into the mold between the shield and the resistor wherein the mold forms first passages in the material, wherein each of the first passages is adjacent an end of the shield and extends in to an end of the resistor and along a portion of the side of the resistor; and removing the spark plug boot resistor assembly from the mold once the material has cured.

9. The process as set forth in claim 8 wherein the mold forms second passages, wherein each of the second passages is adjacent one of the ends of the shield between the material and the shield.

10. The process as set forth in claim 9 wherein the material is injected into the mold through at least one spree located in the second insert of the second portion of the mold.

11. The process as set forth in claim 10 wherein the shield and the resistor are removed from the mold by first separating the second portion of the mold from the first portion of the mold and then removing the spark plug boot resistor assembly from the first portion of the mold.

12. The process as set forth in claim 8 wherein the mold comprises a first portion with a substantially tubular shaped first side wall and a first insert and a second portion with a substantially tubular shaped second side wall and a second insert and wherein the shield and the resistor are first positioned in the first portion of the mold and then the second portion of the mold is connected to the first portion.

13. A process for producing a spark plug boot resistor assembly comprising:

providing a mold with a first portion and a second portion;

positioning a shield in the first portion of the mold;

positioning a resistor inside the shield and in the first portion of the mold;

closing the second portion of the mold over the first portion of the mold;

injecting a material into the mold between the shield and the resistor to form a first passage in the insulating material adjacent each end of the shield which extends in to each end of the resistor, wherein each first passage extends in along a portion of a side of the resistor;

separating the second portion of the mold from the first portion of the mold once the material has cured; and removing the spark plug boot resistor assembly from the first portion of the mold.

14. The process as set forth in claim 13 wherein the first portion of the mold comprises a substantially tubular shaped first side wall and a first insert and the second portion of the mold comprises a substantially tubular shaped second side wall and a second insert.

15. The process as set forth in claim 14 wherein the material is injected into the mold through at least one sprue located in the second insert of the second portion of the mold.

16. The process as set forth in claim 13 wherein the mold forms a second passage adjacent at least one of the ends of the shield between the material and the shield.

* * * * *